United States Patent [19]
Suzuki et al.

[11] Patent Number: 5,622,379
[45] Date of Patent: Apr. 22, 1997

[54] AIR BAG DEVICE FOR VEHICLES

[75] Inventors: Kyojiro Suzuki, Kariya; Minoru Fujioka, Anjo, both of Japan

[73] Assignee: Nippondenso Co., Ltd., Kariya, Japan

[21] Appl. No.: 608,735

[22] Filed: Feb. 29, 1996

[30] Foreign Application Priority Data

Mar. 2, 1995 [JP] Japan .................................. 7-070943
Dec. 19, 1995 [JP] Japan .................................. 7-349341

[51] Int. Cl.⁶ .................................................. B60R 21/20
[52] U.S. Cl. ............................. 280/728.2; 280/731
[58] Field of Search ........................ 280/728.1, 728.2, 280/731, 732, 741

[56] References Cited

U.S. PATENT DOCUMENTS

| | | | |
|---|---|---|---|
| 3,982,774 | 9/1976 | Ivashuk et al. | 280/731 |
| 4,941,678 | 7/1990 | Lauritzen et al. | |
| 5,172,932 | 12/1992 | Watanabe et al. | |
| 5,382,046 | 1/1995 | Cuevas . | |
| 5,388,858 | 2/1995 | Cuevas . | |
| 5,441,299 | 8/1995 | Lauritzen et al. | 280/732 |
| 5,470,102 | 11/1995 | Smith et al. | 280/732 |
| 5,513,572 | 5/1996 | Frantom et al. | 280/741 |

FOREIGN PATENT DOCUMENTS

| | | |
|---|---|---|
| 602785 | 6/1994 | European Pat. Off. . |
| 6-008782 | 1/1918 | Japan . |
| 4-342638 | 11/1930 | Japan . |
| 5-076911 | 10/1993 | Japan . |

*Primary Examiner*—Eric D. Culbreth
*Attorney, Agent, or Firm*—Cushman, Darby & Cushman IP Group of Pillsbury Madison& Sutro LLP

[57] ABSTRACT

An air bag device is provided having an air bag normally folded, an inflator for inflating the air bag, and an ECU for activating the inflator upon detection of vehicle collision. The inflator and the ECU are placed in parallel and fixed to a casing. The air bag is fixed to the casing by a retainer without use of threaded screws.

14 Claims, 2 Drawing Sheets

AIR BAG DEVICE FOR VEHICLES

BACKGROUND OF THE INVENTION

1. Field of the Invention

The present invention relates to an air bag device for vehicles and, more particularly, an air bag device which inflates an air bag installed in a vehicle upon collision of the vehicle.

2. Background of the Invention

As a supplemental restraint system for vehicle passengers, various air bag devices have been proposed. One such device proposed by JP-A 4-342638, for instance, has an air bag, an acceleration sensor and an inflator for inflating the air bag upon detection of vehicle collision by the acceleration sensor. These component parts are housed within a central pad portion of a steering wheel with the air bag being fixedly held in place on a support member by threaded screws. Use of screws results in increase in the number of component parts, assembling work, weight and cost as well as a space for the screw-threading work beneath the central pad portion.

SUMMARY OF THE INVENTION

It is therefore a primary object of the present invention to provide an air bag device which requires no threaded screws for installing an air bag.

It is another object of the present invention to provide an air bag device which is effective to minimize number of-component parts and assembling work and is compact in size and light in weight.

According to the present invention, an air bag is fixed to a casing by a retainer without use of threaded screws and an inflator mounted on the casing is formed with a pair of flanges which restrict movement of the retainer.

Preferably, the casing is formed with a pair of openings through which the inflator is inserted axially for mounting on the casing.

Preferably, the casing is formed with a pair of grooves through which an opening of the bag and the retainer are inserted together. The retainer and the inflator are inserted in the same direction to simplify assembling work.

Preferably, the inflator is made of a gas generator and an adjustor which have respective flanges and coupled through thread engagement.

Preferably, the retainer is formed with a plurality of elastic portions for elastic fitting with an opening formed in the casing for gas discharge. The retainer is formed with an opening which passes the gas from the inflator into the air bag therethrough together with the opening of the casing.

Preferably, an electronic controller which activates the inflator upon vehicle collision is placed adjacently to the inflator.

DETAILED DESCRIPTION OF PRESENTLY PREFERRED EMBODIMENTS

The present invention will be described in detail hereunder with reference to an exemplary embodiment of the present invention illustrated in the accompanying drawings.

Figures 1, 2, 3:
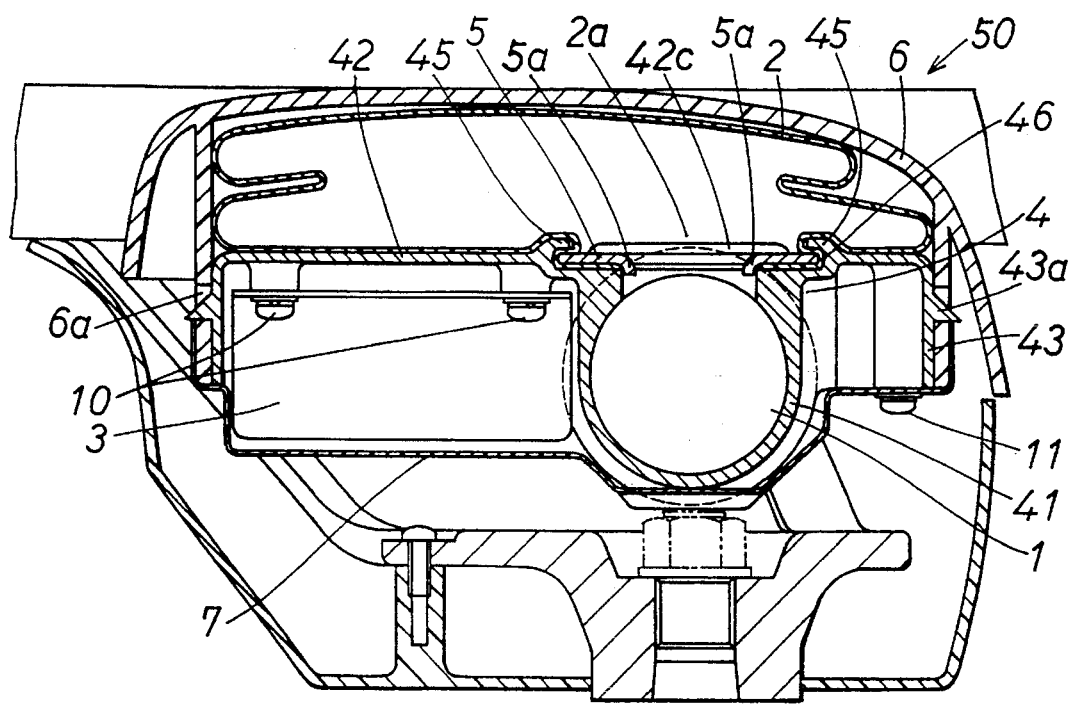
FIG. 1 is a schematic cross-sectional view illustrating an air bag device according to an embodiment of the present invention.
FIG. 2 is a side plan view illustrating an inflator and an inflator fixing nut used in the embodiment illustrated in FIG. 1.
FIG. 3 is a top plan view illustrating the inflator fixing nut illustrated in FIG. 2.

As illustrated in FIG. 1, an air bag device 50 is installed in a central cone portion of a vehicle steering wheel. It has an inflator 1, an air bag 2, and an electronic control unit (ECU) 3. The air bag 2 has an opening 2a for operative connection with the inflator 1 and is installed in a folded condition. The ECU 3 detects a deceleration (acceleration) of a vehicle and generates a collision detection signal in response to the deceleration exceeding a predetermined level indicative of the vehicle collision. The inflator 1 is shaped in a cylindrical or tubular form to extend in parallel with the ECU 3 in an axial or longitudinal direction thereof and generates a gas in response to the collision detection signal from the ECU 3 thereby to inflate the normally folded air bag 2. The inflator 1 and ECU 3 are mounted together to a bottom side of a casing 4, while the air bag 2 is mounted on the top side of the casing 4 at its opening 2a through a retainer 5. The inflator 1, air bag 2, ECU 3 and casing 4 are integrally installed under a cone pad 6 of the steering wheel with a cover 7 covering undersides of the inflator 1 and ECU 3. The ECU 3 is fixed to the casing 4 by threaded screws 10, while the cover 7 is fixed to the casing 4 through threaded screws 11.

The inflator 1 illustrated in FIGS. 2 and 3 is a hybrid-type gas generator which contains therein a gunpowder and a high pressure gas including an inactive gas such as argon. The inflator 1 is formed with a flange 1a at one axial end, a gas container 1b containing the high pressure gas, a powder container 1c threaded at 1e on the outer surface and containing a squib and the gunpowder, and a plurality of gas discharge holes 1d between the gas container 1b and the powder container 1c. An inflator fixing nut 8 is formed with a hollow tube 8a threaded at 8c on the inside surface and a flange at one axial end opposite to the flange 1a. The axial length between the flanges 1a and 8a is adjustable through thread engagement between the powder container 1c and the hollow tube 8a. Thus, the fixing nut 8 functions as an adjustor of the inflator 1.

Figure 4:
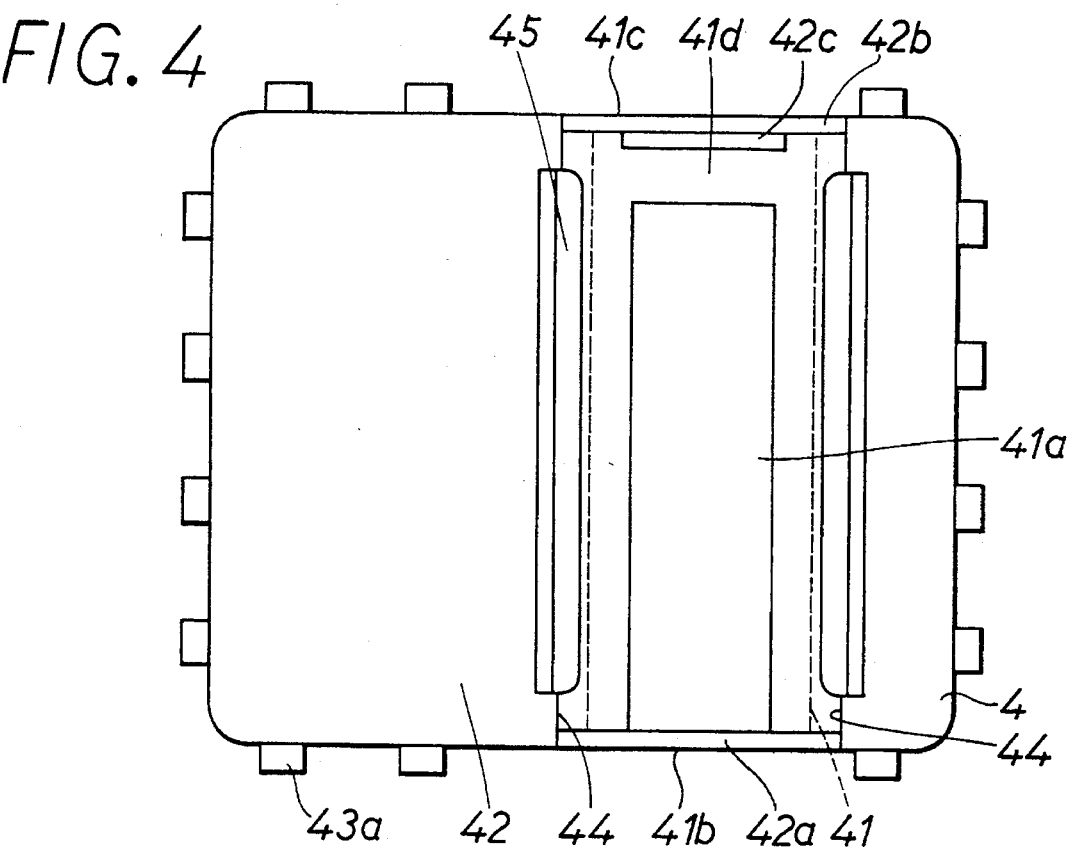
FIG. 4 is a top plan view of a case used in the embodiment illustrated in FIG. 1.

As illustrated in FIGS. 1 and 4, the casing 4 is comprised of a hollow cylindrical container portion 41 for receiving the cylindrical inflator 1 therein, a planar portion 42 for supporting the air bag 2 thereon, and a side wall 43 extending from the outer periphery of planar portion 42. The side wall 43 is formed with a plurality of wedge-shaped projections 43a for engagement with holes 6a of the pad 6.

The cylindrical container portion 41 is formed with a first opening 41a in a rectangular shape on a top surface which extends in the axial direction of the inflator 1 with its width narrower than the diameter of the inflator 1. It also is formed with second and third openings 41b and 41c in a circular shape on both side walls which the flanges 1a and 8b faces so that the inflator 1 and the fixing nut 8 may be inserted axially therethrough for engagement under the planar portion 42. The first opening 41a is in communication with the second opening 41b at one end thereof but not with the third opening 41c at the other end thereof because of a closing bridge portion 41d having a predetermined width in the axial direction of the inflator 1.

on the planar portion 42 of the casing 4, first and second cut-outs 42a and 42b are formed near the axial ends of the container portion 41 so that the flanges 1a and 8b are inserted or fitted. In addition, a projection 42c is formed on the closing portion 41d of the container portion 41 at a position near the second cut-out 42b to restrict one end of the retainer 5.

A pair of longitudinally or axially extending stepped portions 44 are formed in concavity towards the container portion 41 along the container portion 41, and a pair of nail portions 45 are formed in a manner to extend longitudinally and cover the stepped portions 44. The stepped portions 44 and the nail portions 45 form a pair of grooves 46 therebetween for insertion of the retainer 5 and function as an engagement portion.

Figure 5:
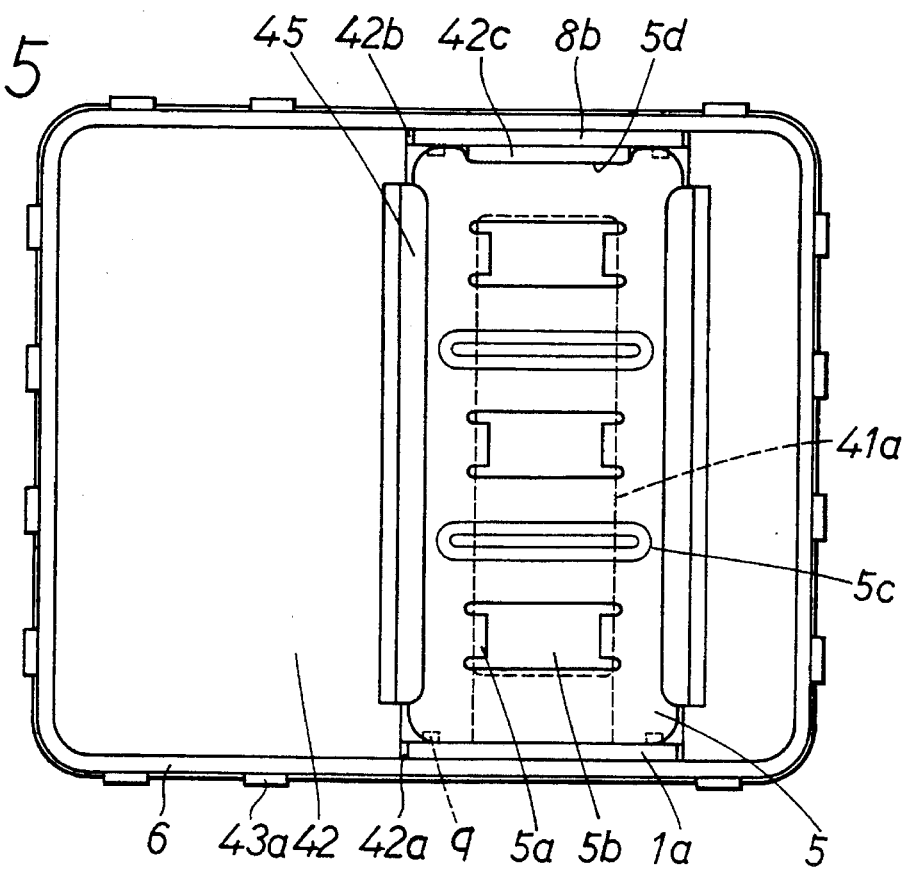
FIG. 5 is a top plan view of the case with a retainer in the embodiment illustrated in FIG. 1.

As illustrated in FIGS. 1 and 5, the retainer 5 which fixes the air bag 2 to the casing 4 is formed in a plate shape and has a plurality of raised portions 5a raised downwardly and having certain elasticity. The raised portions 5a are fitted into the first opening 41a of the casing 4. The retainer 5 also has a recess 5d at one end thereof for engagement with the projection portion 42c. Openings 5b are formed in the retainer 5 between the two raised portion 5a facing each other so that the gas from the discharge holes 1d of the inflator 1 is discharged into the air bag 2 therethrough. Ribs 5c are provided between the holes 5b for reinforcement of the retainer 5.

The air bag 2 is fixed to the inflator 1 in the following manner.

The air bag 2 is engaged with the raised portions 5a of the retainer 5 at the opening end thereof from inside and, together with the air bag 2, the retainer 5 is inserted axially into the grooves 46 formed underside the nail portions 45 in an upward direction in FIG. 5. In this instance, the opening end of the air bag 2 is sandwiched tightly between the retainer 5 and the grooves 46 of the casing 4. When the retainer 5 is further inserted, the recessed portion 5d abuts the projection portion 42c thereby positioning the air bag 2 in place relative to the casing 4. The retainer 5 thus firmly hold the air bag 2 to the casing 4. That is, the raised portions 5a of the retainer 5 and the nail portions 45 and projection 42c of the casing 4 cooperatively function to place the air bag 2 in position.

Then, the inflator 1 is inserted into the cylindrical container portion 41 with its powder container 1c being inserted first from the second opening 41b. When the inflator 1 is fully inserted, the flange 1a fits the first cut-out portion 42a of the casing 4 and abuts the side end (lowermost end in FIG. 5) of the retainer 5.

The inflator fixing nut 8 is inserted into the cylindrical container portion 41 with its hollow tube 8 being inserted first from the third opening 41c, while engaging the inside thread of the nut 8 with the outside thread on the powder container 1c of the inflator 1 until the flange 8b fits the second cut-out portion 42b of the casing 4. Thus, the flange 8b abuts the end of the closing portion 41d and the projection portion 42c of the casing 4. For preventing leakage of the high pressure gas, ring-shaped gaskets 9 are interposed as sealing members between the casing 4 and the inflator 1 as well as between the casing 4 and the nut 8 as illustrated in FIG. 5.

After assembling thus the inflator 1, the retainer 5 is thus sandwiched between the flange 1a and the projection portion 42c of the casing 4 and prevented from coming off out of the groove portions 46. As a result, the air bag 2 can be fixed to the casing 4 without use of screws. With both flanges 1a and 8b being fitted with the casing 4, the inflator 1 also is fixed to the casing 4.

The air bag 2 is installed on the casing 4 with its opening 2a being sandwiched between the nail portions 45 of the casing 4 and the retainer 5 and being placed downside, and the ECU 3 is fixed to the underside of the planar portion 42 of casing 4 through the screws 10 in the parallel relation with the inflator 1. Finally, the cone pad 6 is pressed downwardly so that the pad 6 is tightly engaged with the casing 4 with the projections 43a of the casing 4 being fitted within the holes 6a of the pad 6.

In operation of the above-described embodiment, the ECU 3 generates the collision detection signal upon sensing the high deceleration of the vehicle (vehicle collision) and ignites the squib in the powder container 1b of the inflator 1 to explode the gunpowder and release the high pressure gas in the gas container 1b. The explosion gas and the high pressure gas are discharged into the air bag 2 through the discharge holes 1d of the inflator 1, holes 5b of the retainer 5 and the openings 2a to inflate the air bag 2. In the course of expansion of the air bag 2 from its normally folded condition, it breaks the coupling of the cone pad 6 with the casing 4 and expands fully to protect the passenger in the vehicle from the collision impact.

From the foregoing, it will be understood that the air bag 2 can be fixed to the casing 4 without use of threaded screws, resulting in effective use of a space underside the casing 4 and in reduction of component parts, manufacturing cost, manufacturing work and weight and size of the device. These advantages become more apparent, in the case of forming the container portion 41 for the inflator 1 integrally with the casing 4, and forming the inflator 1 into the cylindrical shape and aligning the same in parallel with the ECU 3. In addition, assembling of the inflator 1 and the retainer 5 to the casing can be simplified more by inserting both the inflator 1 and the retainer 5 in the same longitudinal or axial direction.

The above-described embodiment may be modified in many other ways. For instance, the air bag device 50 may be installed also at other locations in the vehicle to protect other passengers than a vehicle driver facing the steering wheel, the ECU 3 may be installed on a vehicle compartment floor away from the steering wheel, the inflator 1 need not be the hybrid-type, the air bag 2 need not be engaged with the raised portions 5a at the opening 2a thereof, or the end of the retainer 5 may be inserted with the air bag 2 to abut the flange 8a.

What is claimed is:

1. An air bag device for vehicles comprising:

a bag having an opening and held folded;

means for generating a collision signal upon detection of a vehicle collision;

means formed in a tubular shape for generating a gas in response to the collision signal;

a casing formed with a container portion for supporting the gas generating means therein, a first opening for discharging the gas therethrough and an engagement portion for engaging with the opening of the bag around the first opening;

a retainer member coupled to the bag and being operatively associated with the engagement portion of the casing for retaining the opening of the bag to the engagement portion of the casing; and first and second restriction portions formed on axial ends for the gas generating means for restricting movement of the retainer member in an axial direction of the gas generating means.

2. An air bag device according to claim 1, wherein:

the first opening extends in the axial direction of the gas generating means and opens toward the opening of the bag; and the container portion of the casing is formed with a second opening at one axial end for insertion of the gas generating means in the axial direction therethrough.

3. An air bag device according to claim 2, wherein:

the first restriction portion includes a first flange formed at one axial end of the gas generating means and is pressed to an opening end of the second opening of the container portion; and a first sealing member is interposed between the first flange and the opening end of the second opening.

4. An air bag device according to claim 3, wherein:

the gas generating means includes a generator portion formed with the first flange at one axial end thereof, and an adjuster portion movably fitted with the generator portion at the other end of the generator portion; and the second restriction portion includes a second flange formed on the adjuster portion.

5. An air bag device according to claim 4, wherein:

the generator portion and the adjuster portion are formed with respective threads for adjusting an axial distance between the first and second flanges; and the first and second flanges sandwich said casing therebetween thereby to fix the gas generating means to the casing.

6. An air bag device according to claim 4, wherein:

the container portion of the casing is formed with a third opening at an axially opposite side to the second opening;

the second flange is pressed to an opening end of the third opening; and a second sealing member is interposed between the second flange and the opening end of the third opening.

7. An air bag device according to claim 3, wherein:

the container portion of the casing is formed with a projection portion near the first opening; and the retainer member is sandwiched between the projection portion and the first flange.

8. An air bag device according to claim 7, wherein:

the projection is formed vertically to the engagement portion of the casing.

9. An air bag device according to claim 1, wherein:

the first opening has a width narrower than that of the gas generating means.

10. An air bag device according to claim 1, wherein:

the engagement portion includes a pair of grooves formed along the first opening in the axial direction of the gas generating means; and the retainer member is inserted into the grooves together with an opening end of the bag in a manner to cover the first opening thereby to fix the bag to the casing.

11. An air bag device according to claim 1, wherein:

the retainer member is in a plate form and has a plurality of elastic portions which are elastically engaged with the first opening.

12. An air bag device according to claim 1, wherein:

the retainer member is formed with an opening for passing the gas from the gas generating means into the bag.

13. An air bag device according to claim 1, wherein:

the retainer member is formed with a rib for reinforcement.

14. An air bag device according to claim 1, wherein:

the collision signal generating means is placed adjacent to the container portion and attached to the casing.

* * * * *